United States Patent [19]

Nukala et al.

[11] Patent Number: 4,601,381
[45] Date of Patent: Jul. 22, 1986

[54] FLUID VACUUM DISTILLATION SYSTEM

[75] Inventors: August R. Nukala, Galien; Arthur Perez, Buchanan; Timothy L. Brumfield, Niles, all of Mich.

[73] Assignee: RPR Filtration Systems, Inc., South Bend, Ind.

[21] Appl. No.: 535,998

[22] Filed: Sep. 26, 1983

Related U.S. Application Data

[63] Continuation-in-part of Ser. No. 520,798, Aug. 5, 1983.

[51] Int. Cl.⁴ .................................................. B01D 3/10
[52] U.S. Cl. ................................. 196/114; 196/46.1; 196/132; 196/133; 202/176
[58] Field of Search .............. 196/46.1, 114, 121, 196/132, 134, 137, 155, 138, 133; 202/176; 201/1; 208/187; 73/308, 313 D; 340/623, 624; 250/573, 574

[56] References Cited

U.S. PATENT DOCUMENTS

| | | |
|---|---|---|
| 1,424,642 | 8/1922 | Hanlon et al. . |
| 1,566,948 | 12/1925 | Wyatt . |
| 1,567,458 | 7/1925 | Newton ............................. 196/100 |
| 2,006,430 | 7/1935 | Ashworth . |
| 2,270,457 | 1/1942 | Martin . |
| 2,495,613 | 1/1950 | Tuttle ................................. 208/126 |
| 2,558,933 | 7/1951 | Cross . |
| 2,633,023 | 3/1953 | Van Ham . |
| 2,687,108 | 8/1954 | Walker . |
| 2,971,897 | 2/1961 | Chapman ........................... 196/122 |
| 3,179,919 | 4/1965 | Rizzuto et al. ....................... 340/623 |
| 3,722,537 | 3/1973 | Gregerson et al. . |
| 4,037,193 | 7/1977 | Uemura ............................... 340/623 |
| 4,066,997 | 1/1978 | Ohmi et al. . |
| 4,213,699 | 7/1980 | Moore ................................. 250/573 |
| 4,291,983 | 9/1981 | Kraft et al. .......................... 250/574 |
| 4,344,429 | 8/1982 | Gupton et al. ...................... 250/574 |
| 4,356,729 | 11/1982 | Kubota et al. . |
| 4,391,129 | 7/1983 | Trinh et al. ......................... 250/573 |

Primary Examiner—Peter Kratz
Attorney, Agent, or Firm—Barnes & Thornburg

[57] ABSTRACT

Apparatus for monitoring fluid condition in a fluid recovery system for removing water and solid contaminants from a fluid is disclosed. One aspect of the present invention relates to an improved fluid level indicator device for indicating and controlling the fluid level in a vacuum distillation chamber. A second aspect of the invention relates to an improved sight glass used for monitoring the condition of the cleaned fluid. The sight glass is a one-piece unit formed from a homogeneous, substantially transparent material. Both fluid level indicator and sight glass are designed to function individually or in combination in the severe environment and under the diverse operating conditions of the fluid recovery system.

8 Claims, 5 Drawing Figures

FLUID VACUUM DISTILLATION SYSTEM

BACKGROUND AND SUMMARY OF THE INVENTION

This application is a continuation-in-part of our commonly assigned co-pending application Ser. No. 520,798, filed on Aug. 5, 1983 for our invention entitled "Fluid Recovery System." A preferred embodiment of a system for recovery of fluid by means of vacuum distillation and filtration which can be utilized with the present invention is described in the above-noted application. To the extent necessary to aid those skilled in the art in understanding the present invention, the above referenced disclosure is hereby incorporated into this disclosure by reference thereto.

The present invention is specifically related to apparatus for monitoring fluid conditions in vacuum distillation and filtration systems. Fluid to be processed by these systems enters a vacuum chamber where it is first heated while being, held under negative pressure for further purification by removal of moisture contamination, then filtered to remove solid impurities. The present invention relates to novel means for more efficiently and advantageously controlling the rate at which the fluid is processed, the level of fluid in vacuum chamber under normal and abnormal conditions, the degree of purity of the processed fluid, and other important fluid conditions. The invention described below is especially well suited for operation in the severe environment found inside the vacuum chamber.

The importance of the present invention is especially apparent when considered in light of the widespread usage of vacuum distillation and filtration systems of the type described in the above-noted application. These systems are used in a variety of manufacturing, industrial and business settings. Applications range from recycling hundreds of gallons of expensive cooling fluid used by machine tools of large manufacturing concerns to the processing of relatively small volumes of waste oil by local gasoline retailers. Operating demands on individual systems may vary widely, as may the skill levels of operating personnel. Under such a wide variety of conditions, simplicity of construction in operation, ease of maintainability and repair, and increased reliability and efficiency are especially important to successful system operation.

One aspect of the present invention relates to an improved fluid level indicator device for indicating and controlling the fluid level in a vacuum distillation chamber. The indicator device of the present invention has a combination of features which increases the reliability and accurary of operation, improves the ease of manufacture, and simplifies the task of installing, maintaining, repairing and replacing the device, or parts thereof. A second aspect of the invention relates to an improved sight glass useful for monitoring the condition of the cleaned fluid. The sight glass is a one-piece unit formed from a homogeneous, substantially transparent material. Both fluid level indicator and sight glass are designed to function individually or in combination in the severe enrivonment and under the diverse operating conditions discussed above.

A preferred embodiment of the sight glass has internal threads formed on either end of the flow opening extending through the sight glass. The sight glass can be inserted directly into a flow line, thus obviating the need for seals between disparate materials often used in connecting prior art sight glasses to flow lines. The absence of seals makes the present device especially useful when the fluids to be handled are corrosive.

An especially preferred embodiment of the sight glass has a generally flat surface formed substantially parallel to the flow opening. Molded or machined into this surface are a plurality of concentric grooves which act to focus or concentrate the light being transmitted through the sight glass. Optional illumination means may be provided adjacent to this surface to insure availability of an adequate amount or proper type of light.

In operation, the sight glass is placed in either incoming or outgoing flow lines to monitor the condition of the process fluid. For example, when placed in the fluid outline, the device provides an indication of fluid purity which can be observed visually by the operator, or automatically by the provision of appropriate light sensing control means. The observed fluid condition can be utilized to selectively control either withdrawal of adequately cleaned fluid from the system, or an additional cycling of the fluid through the vacuum chamber for further purification.

An especially advantageous combination results when the fluid monitoring system includes not only the sight glass described above, but also the fluid level indicator which is described below. As adequately cleaned fluid is withdrawn from the system, the fluid level indicator senses the change in fluid level and initiates signals capable of causing manual or automatic addition of fluid to the chamber. In a more sophisticated embodiment of the fluid recovery system, sight glasses may be placed in both in-flow and out-flow lines and a plurality of fluid level indicators may be provided on the vacuum chamber to provide control of the fluid level in the chamber in response to the condition of both the incoming and outgoing fluid.

A preferred embodiment of the indicator device includes a reservoir detachably connected to the main body of the vacuum distillation chamber by a generally horizontal conduit. The end of the conduit distal the reservoir is preferably provided with one of threads, a bayonet-type fitting, and other easily detachable means for simplifying connection of the indicator device to the vacuum chamber. Fluid is communicated from the vacuum chamber to the reservoir through the conduit which is connected to the chamber at or near the level at which control or indication of fluid is desired. Certain preferred embodiments further include a float assembly which is insertable into an opening in the top of the reservoir. The float assembly includes a cap provided with an O-ring seal to prevent loss of vacuum, a float guide detachably mounted to the bottom of the cap, and a float member mounted on the guide. The float guide extends downwardly into the reservoir and allows the float member to move vertically in response to fluid level changes in the reservoir.

In an especially preferred embodiment of the indicating device, the float member contains a magnetic element which operates an electrical switch contained in the float guide. A float guide and float member suitable for this application is available from Fluid Products Co., Eden Prairie, Minn. General use of this type of float guide and float member or fluid level control in quite a different environment is shown in U.S. Pat. Nos. 4,066,997 and 4,356,729. The indicator assemblies shown in those patents are not, however, provided with the constructional features of the present device which make it especially suitable for use in the severe enrivonment of a vacuum distillation chamber. Although this type of switch is especially preferred, many of the advantages offered by this fluid level indicator can also be obtained by the use of other types of float guides and members (e.g., mechanical float indicators) according to other embodiments contemplated by the present invention.

In an especially preferred embodiment of the indicator device, the float member moves in response to fluid level in the reservoir from its lowest position to its highest position before the cross-sectional flow area of the conduit fills completely with fluid. The area above the fluid in the conduit acts as a vent to ensure equalization of negative pressure above the fluid in the reservoir to that maintained in the vacuum chamber. This provides for a more accurate and responsive indication of fluid level in the vacuum chamber without necessitating the provision of a separate vent opening and conduit. In keeping with this especially preferred embodiment, the combination of the reservoir and conduit is formed as a generally L-shaped body with the float member disposed directly in line with the horizontal conduit. According to other preferred embodiments, the body is generally T-shaped, or shaped as an inverted L, with the float member disposed below the horizontal axis of the conduit.

The reservoir and conduit are preferably formed by molding or machining from a variety of material. According to alternative embodiments, they are constructed of readily available pipe fittings. An exemplary working model was constructed using a 1-3/8" copper "T" fitting for the reservoir body. A copper conduit having threads on one end was silver soldered into the center opening of the T. One end of the through portion of the T was sealed, by soldering in a copper plug, to act as a bottom of the reservoir. The other end remained open to receive the insertable float assembly. The cap to which the float member carrying float guide was attached was machined from cold drawn steel rod. The outer diameter of that portion of the cap measuring 1-3/8" in length from the bottom was machined to fit with clearance into the 1-3/8" copper fitting. A groove was provided around this portion to accept an O-ring selected to fit with interference into the 1-3/8" fitting. The remaining 5/32" length of the cap was machined to an outer diameter of 1-1/2" and provided with a knurled face to facilitate removal of the float assembly from the T.

When used with a fluid recovery system as described in this and our above-referenced co-pending application, a fluid level indicator constructed according to this invention offers several advantages over known prior art devices. A float operated valve used to control fluid level in a vacuum distillation chamber is shown in U.S. Pat. No. 2,006,430. This float assembly requires connection to at least two openings in the vacuum chamber (one above and one below the fluid level) and does not offer the advantages afforded by the ease of disassembly and detachment present in the subject invention. An example of a non-float type fluid level control device is shown in conjunction with a vacuum distillation chamber in U.S. Pat. No. 2,558,933.

Other objects, advantages and novel features of the present invention will become apparent from the following detailed description of a preferred embodiment when considered in conjunction with the accompanying drawings.

DETAILED DESCRIPTION OF THE DRAWINGS

Figure 1:
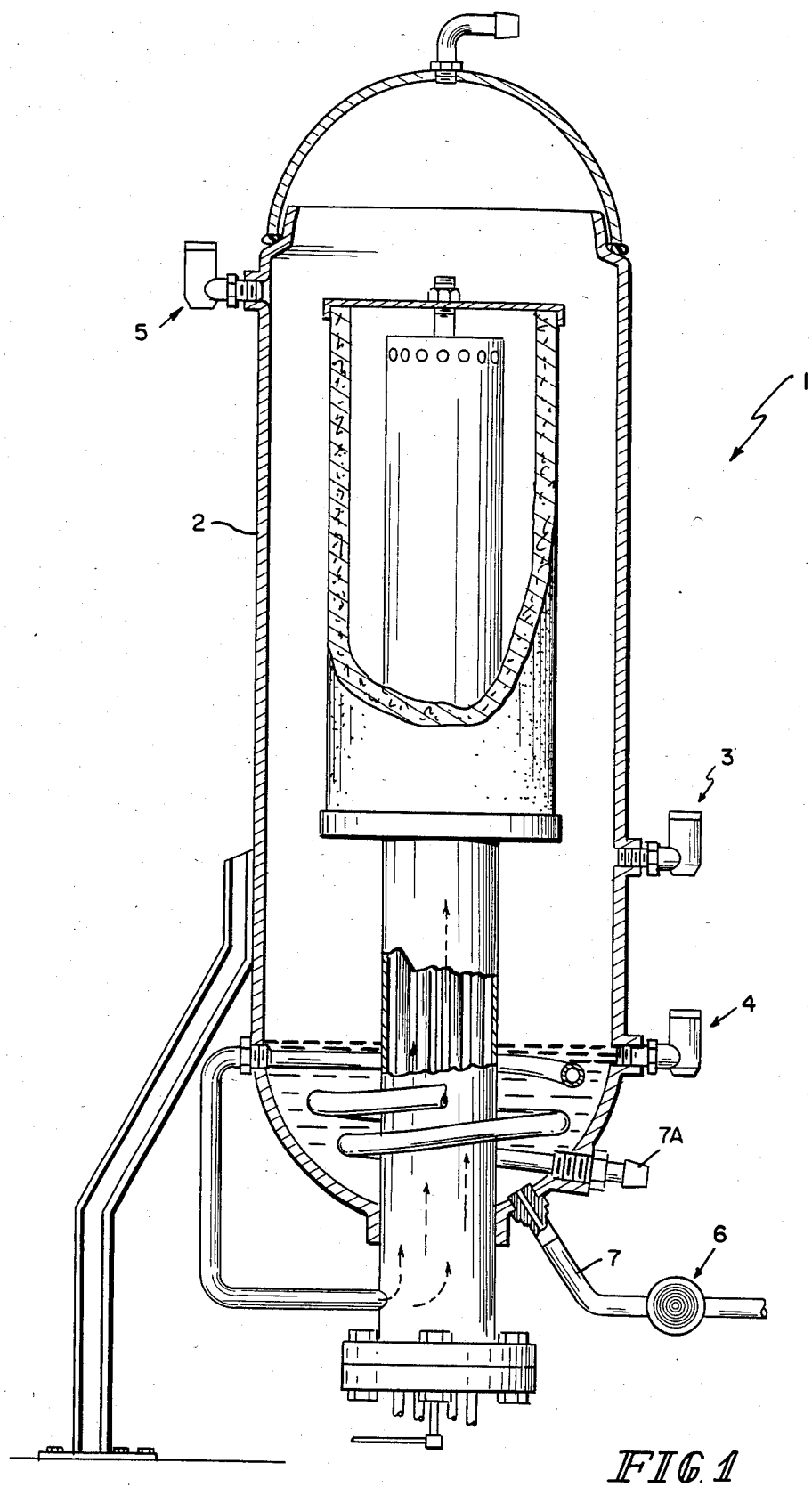
FIG. 1 is a schematic side part sectional view showing a fluid vacuum distillation and filtration machine constructed in accordance with a preferred embodiment of the present invention.

FIG. 1 schematically illustrates a vacuum distillation and filtration machine 1 which includes a substantially cylindrical vacuum vessel 2. Identical fluid level detectors 3, 4 and 5 are shown connected to vacuum vessel 2. Sight glass 6 is shown connected to outline 7. A detailed description of the various parts and operation of vacuum distillation and filtration machine 1 can be found in the above-referenced co-pending application.

Figure 2:
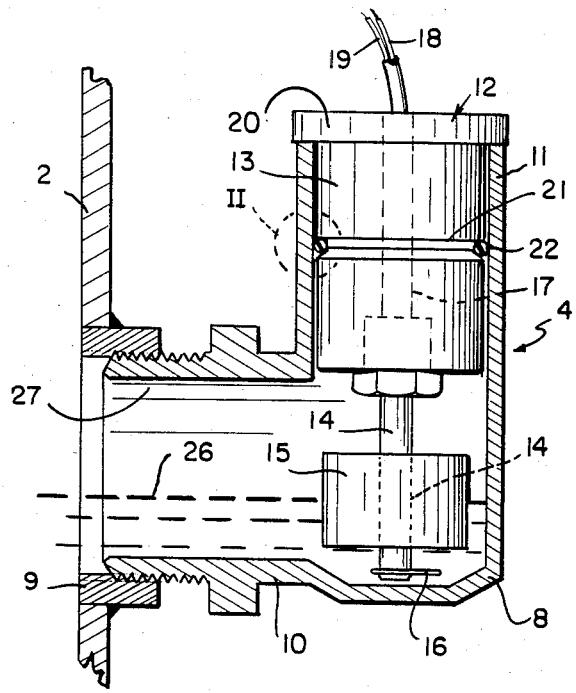
FIG. 2 is an enlarged sectional view showing the details of the fluid level indicator of the FIG. 1 embodiment.

FIG. 2 shows an enlarged sectional view illustrating the details of fluid level indicator 4. Indicator 4 includes a vertically oriented reservoir 8 connected to threaded connection opening 9 in vessel 2 by a generally horizontal conduit 10. The top part 11 of reservoir 8 has a generally cylindrical and uniform cross-section and is open to receive insertable float assembly 12.

Float assembly 12 comprises cap 13, float guide 14 and float member 15 which is movably mounted on float guide 14. Float member 15 is retained on float guide 14 by a spring clip or other suitable retaining means 16. Float guide 14 is detachably mounted to cap 13 by threads which engage a threaded portion of opening 17 which extends through cap 13. Opening 17 also serves as a conduit for leads 18 and 19 which are connected to a magnetically operated electrical switch (not shown) in float guide 14.

The portion of cap 13 which extends into top part 11 of reservoir 8 is generally cylindrical and uniform in cross-section and has an outer diameter which is slightly smaller than the inner diameter of top part 11. The portion of cap 13 not extending into top part 11 has an outer diameter which is larger than the inner diameter of top part 11, creating flange 20 on cap 13. Flange 20 interacts with top part 11 to restrict the downward movement of float assembly 12 into reservoir 8.

Figure 3:
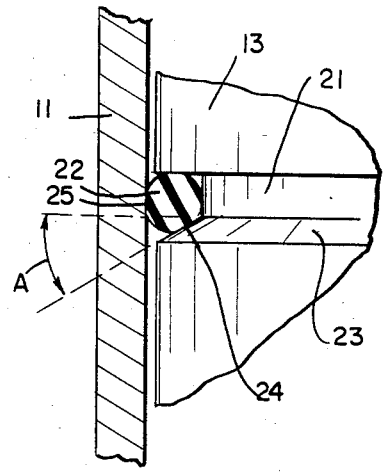
FIG. 3 is an enlarged view of detail II of FIG. 2.

Annular groove 21 extends around the outer circumference of cap 13 to accept O-ring sealing means 22 which forms a vacuum-type seal between cap 13 and top part 11. Referring to detail II of FIG. 2, illustrated in enlarged form in FIG. 3, lower side wall 23 of groove 21 is machined at angle A, which departs from horizontal by approximately 30°, to provide an effective seal between cap 13 and top part 11 at points 24 and 25, respectively.

In operation, a rise in fluid level 26 causes float member 15 to move vertically upwardly along float guide 14. Float member 15 carries a magnetic element which causes the magnetically operated switch in float guide 14 to operate. In the preferred embodiment shown, operation of the switch takes place before fluid level 26 rises enough to completely fill area 27 in conduit 10.

Figure 4:
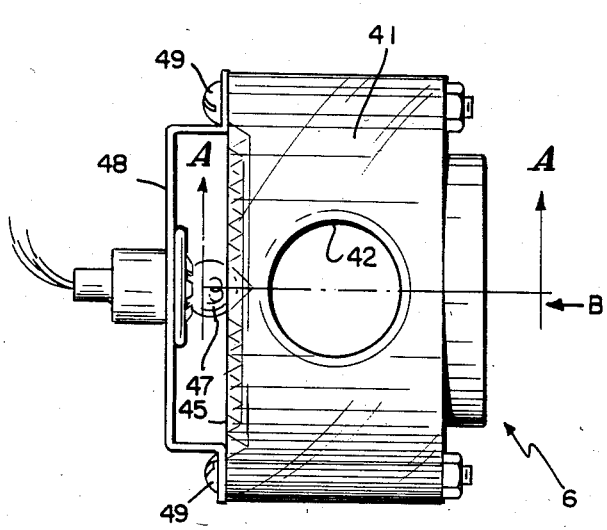
FIG. 4 is a schematic side view of the sight glass with optional illumination means attached.
Figure 5:
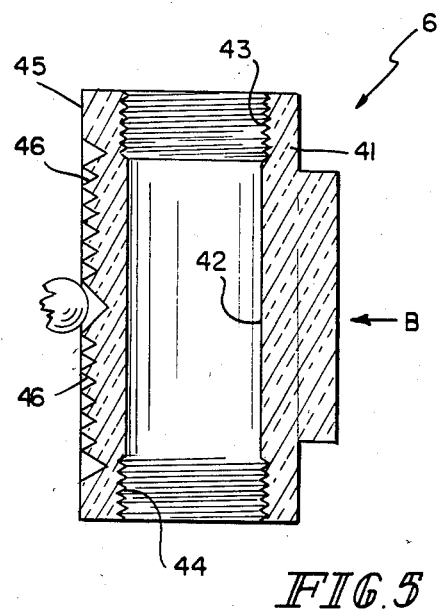
FIG. 5 is a sectional view along line A—A of FIG. 4.

Referring now to FIG. 4, there is shown a side view of sight glass 6. Extending through main body 41 is flow opening 42 which has internally threaded portions 43 and 44, illustrated in FIG. 5, on either end. Substantially parallel to flow opening 42 is flat side 45 which has concentric grooves 46 disposed thereon. FIG. 4 also shows optional illumination means 47 held in place over the approximate center of flat side 45 by bracket 48 which is in turn held to main body 41 by screws 49.

In operation, sight glass 6 is attached to outline 7 by direct engagement with threaded portions 43 and 44. The flow of processed fluid is observed from the direction of arrow B. In especially preferred embodiments, fluid which remains dark in color may be recycled into inlet 7a for further cleaning. When the fluid is sufficiently light in color, indicating the desired degree of fluid cleanliness has been achieved, the fluid is removed from the system.

Referring back to FIG. 1, fluid level indicators 3 and 5, both of which are identical to and interchangable with fluid level indicator 4, are connected to vacuum vessel 2 at points above indicator 4. Indicator 3 serves to monitor the highest desired fluid level in vacuum vessel 2. Indicator 5 operates as a safety feature to control shutdown of the machine in the event it is inadvertently filled with liquid to that level, thus protecting the machine and environment from overflow.

While we have shown and described a single embodiment in accordance with the present invention, it is understood that the same is not limited thereto, but is susceptible to numerous changes and modifications as would be known to those skilled in the art of the present disclosure and we therefore do not wish to be limited to the details shown and described therein, but intend to cover all such changes and modifications that are encompassed by the scope of the appended claims.

What is claimed is:

1. A fluid recovery system comprising:
   a vacuum vessel including fluid inlet means for supplying fluid to be cleaned to the vessel and fluid outlet means for withdrawing cleaned fluid from the vessel;
   means for causing at least a portion of the fluid to be vaporized intermediate the fluid inlet and outlet means;
   at least one connection opening extending through a wall of the vacuum vessel; and
   monitoring means for monitoring conditions of process fluid wherein said monitoring means includes a fluid level indicator means comprising a reservoir, generally horizontal conduit means for connecting one of said connection openings to the reservoir, and a float assembly having a float member operably disposed in said reservoir adjacent to said connection opening, wherein said float member is disposed so as to move between a first lowest position, indicative of an absence of fluid in the indicator, to a second highest position, indicative of a highest desired level of fluid in the indicator, before the cross-sectional flow area of said conduit means fills with fluid, wherein said indicator means is connected to said vacuum vessel via a single connection opening, said indicator means detachably connected, by threads or the like, to the connection opening, and wherein said float assembly includes a float guide, said float member mounted so as to move along the float guide in response to fluid level changes in the reservoir.

2. A fluid recovery system according to claim 1 wherein said monitoring means further comprises a one-piece sight glass formed from a homogeneous, substantially transparent material.

3. A fluid recovery system according to claim 1 wherein said fluid assembly comprises a cap, said float guide being detachably mounted to the cap, and float member retaining means provided on the float guide.

4. A fluid recovery system according to claim 3 wherein said float assembly is insertable into the reservoir, with sealing means provided between the cap and the reservoir.

5. A fluid recovery system according to claim 2, wherein said sight glass has at least one substantially flat side having a plurality of concentric grooves disposed thereon.

6. A fluid recovery system according to claim 5, wherein said sight glass has illumination means disposed adjacent to said substantially flat side.

7. A fluid recovery system according to claim 6, wherein said sight glass further comprises light sensing control means responsive to light transmitted or reflected through said sight glass.

8. A fluid recovery system according to claim 1, wherein said monitoring means includes a first fluid level indicator for detecting a low operating fluid level in the vessel, a second fluid level indicator for detecting a high operating fluid level in the vessel, and a third fluid level indicator for detecting an overflow condition.

* * * * *